Nov. 26, 1968  R. G. ROGERS  3,413,446
PROPORTIONAL AND INTEGRATING TEMPERATURE CONTROLLER
Filed April 25, 1967  2 Sheets-Sheet 1

INVENTOR.
ROBERT G. ROGERS

BY *[signature]*
ATTORNEY

INVENTOR.
ROBERT G. ROGERS

BY
ATTORNEY

United States Patent Office 3,413,446
Patented Nov. 26, 1968

3,413,446
PROPORTIONAL AND INTEGRATING TEMPERATURE CONTROLLER
Robert G. Rogers, Los Altos, Calif., assignor to Automatic Electric Laboratories, Inc., a corporation of Delaware
Filed Apr. 25, 1967, Ser. No. 633,595
9 Claims. (Cl. 219—501)

ABSTRACT OF THE DISCLOSURE

Deviation of oven temperature from a desired value is sensed by a Wheatstone bridge which has three resistance arms which may be located external to the oven and one temperature sensitive variable resistance arm located in the oven. The bridge is energized by AC and DC power and produces both DC and AC error signals when the bridge is unbalanced. The DC error signal is applied to an integrating device such as a memistor which has a resistance equal to the integral of that error signal. An AC signal that is applied to a voltage divider network that includes the resistance of the memistor is used to derive an integrating error signal. The AC error signal is directly proportional to the temperature error and is used to derive a proportional control signal. The integrating and proportional control signals are combined to produce a correction signal which is applied to the oven heater to maintain the desired temperature.

Background of invention

This invention relates to temperature controls for ovens and the like, and more particularly to precision controllers for ovens used to stabilize the frequency of crystal controlled oscillators.

The natural frequency of oscillation of a crystal depends, inter alia, upon ambient temperature. One current practice designed to minimize variation in ambient temperature is to insert the crystal in an oven having a controlled temperature elevated above ambient and below that which would adversely affect crystal performance. Control for the oven typically uses a power supply, a thermostat or temperature sensitive relay, and a heater winding which cooperate in the well-known manner to produce an interrupted current flow in the winding as the oven temperature fluctuates about the desired level. The difficulty with such on-off control is its inability to limit temperature fluctuation to less than about two degrees centigrade.

Other oven control systems seek to limit temperature excursions by deriving a correction signal that is proportional to the error signal from the sensing element. This control, known as proportional control, does minimize temperature fluctuations to as little as 0.01° centigrade but has the disadvantage of inherently requiring the existence of a steady-state error.

Another technique for obtaining precise control of temperature in use of a double oven. The oscillator crystal is enclosed in an inner oven which in turn is surrounded by an outer oven. The temperatures of both ovens are controlled, the outer oven being controlled to within a few degrees of the desired crystal temperature, thereby minimizing ambient temperature effects on the inner oven. The temperature of the inner oven is even more closely controlled. While the double oven arrangement minimizes temperature deviations, it is more costly and furthermore utilizes proportional control with the limitations described above.

Summary of invention

The output of an oven temperature error sensor is applied separately to a proportional controller and to an integrating controller, the outputs of which are then combined to derive a correction signal for the oven heater. Thus the correction signal reflects both the rapid reaction of the proportional controller to oven temperature error and the time integral of such temperature error, the latter providing an effective measure of small persistent temperature deviations. When the oven temperature is stabilized at the set-point and there is no temperature error, the integrating controller continues to supply a sufficient correction signal to the heater to compensate for oven heat losses.

The control circuit is energized so that AC outputs from the proportional and integrating controllers have a phase relation which results in addition or subtraction of these outputs when combined to control the sense or direction of the correction signal to the oven heater.

A general object of the invention is the provision of an oven temperature control circuit which maintains a constant oven temperature without dependence upon a steady-state error signal.

Another object is to provide precise control without attendant increases in complexity and cost of the oven controller.

Detailed description of the invention

Figure 1:
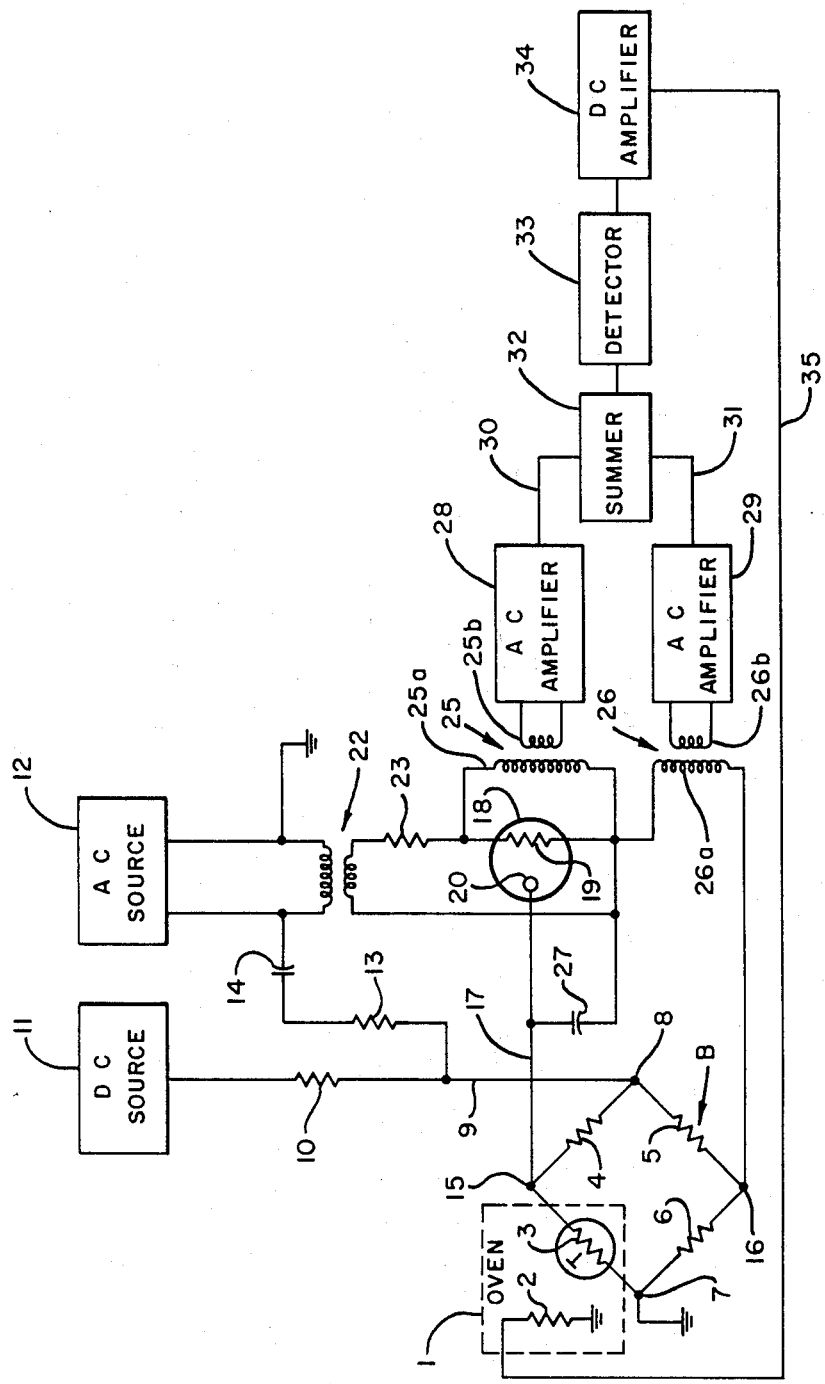
FIGURE 1 is a simplified block and schematic diagram of a control circuit embodying the invention.

Referring to FIGURE 1, oven 1 is designated as a broken line rectangle and represents the structure within which an oscillator crystal or the like is enclosed and the temperature of which is to be controlled. Mounted within the oven is a heater winding 2 and the oven temperature sensing element 3 which preferably is one arm of a Wheatstone bridge B, having fixed resistors 4, 5 and 6 in its other three arms, respectively. Bridge terminal 7, at the junction of resistors 3 and 6, is preferably connected to ground and terminal 8, at the junction of resistors 4 and 5, is connected by line 9 and resistor 10 to a source 11 of direct current, such as a battery. Bridge terminal 8 is also coupled to a source 12 of alternating current by line 9, resistor 13 and blocking capacitor 14. Thus bridge B is energized by both AC and DC power.

An output from the bridge occurs when it is unbalanced by temperature responsive changes in the resistance of sensing element 3 and appears across terminals 15 and 16 of the bridge. When the oven temperature is at the desired value, the bridge is balanced and no output appears across terminals 15 and 16. In reality, the DC and AC balance conditions do not necessarily occur at exactly the same temperature unless both the AC and DC resistances of temperature sensitive element 3 are the same. The AC balance is not critical and no degradation in performance is experienced if the AC and DC nulls do not coincide exactly at the same temperature. If it is desirable that the AC and DC nulls coincide, a simple shunt device shown in FIGURE 3 and explained later may be used to accomplish this result.

The DC potential between bridge terminals 15 and 16, resulting from bridge unbalance is applied by line 17 to an integrating device 18 such as memistor. Memistor 18, which does not per se constitute part of this invention, operates on an electroplating principle to change the resistance of its electrode 19 in proportion to the amount of direct current applied to its electrode 20. The device is responsive to the polarity of the applied current either to plate electrode 19 with a conductor, such as copper, and decrease its resistance or to remove the conductor from or deplate that electrode and increase its resistance. The memistor therefore is an integrating device since the value of the resistance of its electrode 19 is a measure of the amount of direct current applied to it over a period of time.

Electrode 20 of memistor 18 is connected by line 17 to bridge terminal 15. The output of AC source 12 is coupled by transformer 22 to resistor 23 and memistor resistance electrode 19, which resistors form a voltage divider. The primary winding 25a of transformer 25 is connected across electrode 19 from which the integrated error signal is derived. The primary 26a of transformer 26 is connected across bridge terminals 15 and 16, with the connection to terminal 15 being made via DC blocking capacitor 27. The AC error signal is thus applied directly to the primary of transformer 26.

The secondary 25b of transformer 25 is connected to the input of AC amplifier 28 and the secondary 26b of transformer 26 is connected to the input of AC amplifier 29. The separate outputs of amplifiers 28 and 29 are connected to summer 32 by connecting lines 30 and 31. The output of summer 32 which is the combination of the integrated and proportional AC error signals is applied to detector 33, the output of which is rectified and constitutes the input to DC amplifier 34. The amplified DC output from amplifier 34 is applied directly to heater winding 2 by connecting line 35.

When the oven is first turned on, a large bridge unbalance exists, since the desired or set-point oven temperature is usually high with respect to the ambient temperature. Thus the AC proportional control signal between bridge terminal 15 and 16 is large and acts through transformer 26, AC amplifier 29, summer 32, detector 33 and DC amplifier 34 to supply maximum proportional control current to oven heater winding 2. At the same time, the sense or polarity of the DC control potential from the bridge to integrator 18 is such that copper plating, if any, is removed from electrode 19 to further increase its resistance which normally, then, is at or near its maximum value. The AC output from the integrator is taken by the primary of transformer 25 across electrode 19 and therefore is controlled by the magnitude of that electrode resistance. The use of an AC signal in this circuit simplifies amplification and yet does not influence the DC integrator control circuit and the uniformity of plating and deplating or electrode 19. The output from transformer 25 is amplified in AC amplifier 28 which provides a maximum integrated error signal. Under these start-up conditions, the AC output from the integrator 18 is in phase with the proportional control signal which therefore add together to produce a maximum correction signal and increase power to the heater winding 2. In other words, transformers 22, 25 and 26 are so connected that when the oven temperature is below normal, both the integrated control and proportional control signals are in phase at the output of AC amplifiers 28 and 29 respectively. When combined in summer 32, the integrated and proportional control signals then add so that a maximum combined correction control signal is obtained and, hence, a maximum current is supplied to heater winding 2.

As the oven heats up, the bridge approaches balance and the proportional control signal is reduced accordingly. However, the integrated control signal does not change because the integrator resistance remains at a maximum value and the polarity of the DC bridge output is yet unchanged. The proportional control signal continues to decrease and finally reaches zero at AC bridge balance. The integrator, however, because of its inability to change resistance without a change in polarity of its input, continues to produce an integrated control signal having a maximum value. As the oven temperature rises above the desired level, the resistance of element 3 increases, for positive temperature coefficient thermistors, beyond the value for DC balance of the bridge and the polarity of the DC output from the bridge changes. Upon reversal of the DC output from the bridge, plating begins thereby reducing integrator resistance and likewise the AC integrated control signal.

At about this same time, depending upon the difference in DC and AC balance conditions, the AC output from the bridge reverses phase by 180 degrees because resistance 3 reversely unbalances the bridge and the proportional control signal with reversed phase is applied to summer 32 in phase opposition to the integrated control input so as to cause a reduction in heater current. Since the AC proportional control signal is instantly responsive to AC unbalance of the bridge, it is immediately effective to reduce the temperature error, thus avoiding a prolonged deviation of oven temperature from the desired level.

While the oven temperature is above set-point, plating continues, reducing the resistance of electrode 19 and, correspondingly, the magnitude of the integrated control signal. At bridge balance, the proportional control output is zero but the integrating control output is just sufficient to overcome normal oven heat losses. Thus, the proportional control signal acts quickly to reduce oven temperature error and the integrated control signal operates to compensate for heat losses with but a negligible deviation from set-point for wide ambient temperature changes. The temperature at the sensing element will have no steady-state error with changes in ambient temperature. Any change of temperature within the oven with ambient change depends upon the quality of the oven design and construction, and can be at least within 0.01° for a relatively simple oven construction.

Figure 2:
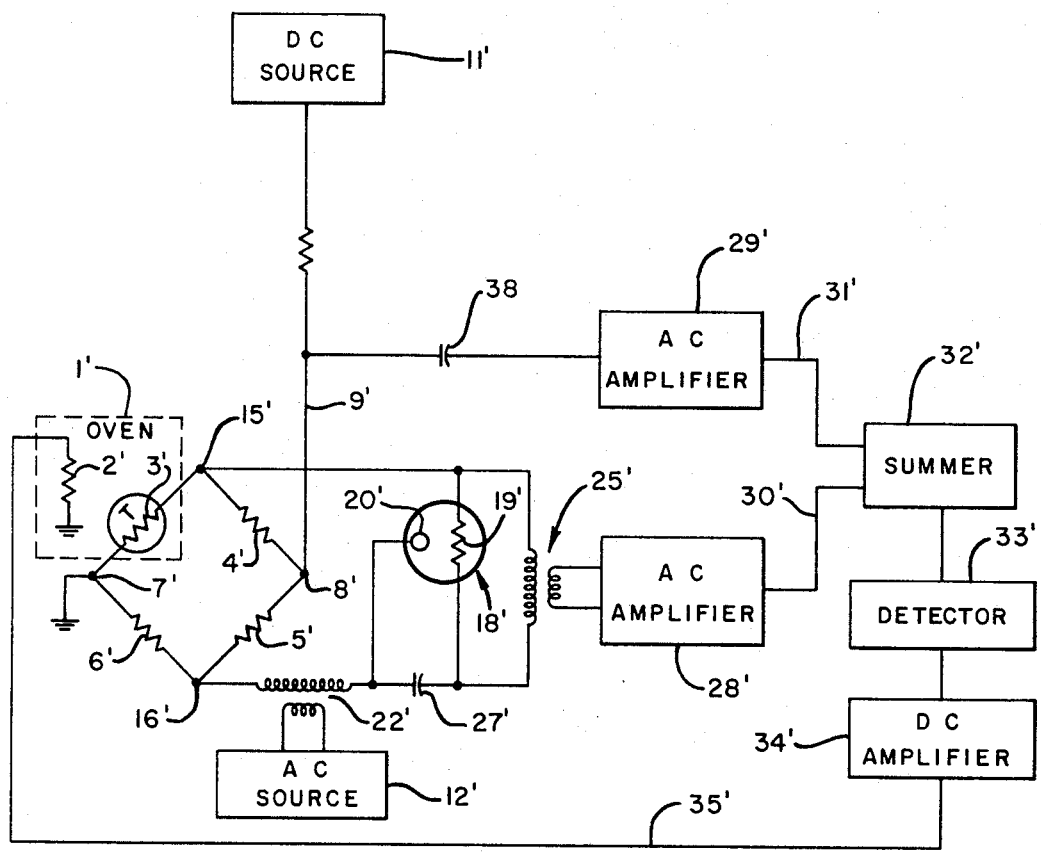
FIGURE 2 is a similar diagram of a modified control circuit embodying the invention.

A second embodiment of the invention is shown in FIGURE 2. This differs from the embodiment of FIGURE 1 principally in the elimination of the transformer 26, the use of different bridge terminals for the AC and DC source inputs, and the elimination of resistor 23 in series with integrator electrode 19 and replacement thereof with an equivalent bridge resistance. In other words, the voltage divider network formed by the integrator comprises the integrator resistance and a portion of the bridge resistance. Since the circuits of FIGURES 1 and 2 are otherwise substantially the same in structure and function, like parts are identified by the primes of corresponding reference characters on the drawings.

Referring now to FIGURE 2, thermistor 3' and resistors 4', 5', and 6' make up a bridge such as was shown in FIGURE 1 with the temperature sensing element 3' located within the oven 1'. Voltage from DC source 11' is applied to terminals 7' and 8'. DC output from the bridge when unbalanced is applied between integrator electrode 20' and its resistor electrode 19'. Plating action is as previously described and depends upon the sense or polarity of the DC output voltage from bridge terminals 15' and 16'.

The AC signal from source 12' is applied through transformer 22' to bridge terminal 16' and to the integrator resistance electrode 19' through DC blocking capacitor 27'. The AC signal voltage across electrode 19' represents the integral of the plating current flowing in the integrator when a DC voltage exists between bridge terminals 15' and 16'. When an equilibrium condition is reached and the bridge is balanced the AC signal across the integrator resistance is such that the amplified output used to control energization of the oven heater 2' compensates for the normal losses of the oven.

AC source 12' also applies an AC potential between 15' and 16' of the bridge and when an unbalanced condition exists, an AC output signal is obtained between bridge terminals 7' and 8'. The magnitude of this AC output signal is proportional to the temperature difference between that in the oven and the desired oven temperature. This proportional control signal is applied directly to amplifier 29' via DC blocking capacitor 38. The outputs from amplifier 28', representing the integrated control signal, and from amplifier 29', representing the proportional control signal, are summed in summer 32'. As explained for the embodiment of FIGURE 1, the combined outputs are then detected and the output is used to control the output of DC amplifier 34' which in turn supplies the proper current to heater winding 2'.

Figure 3:
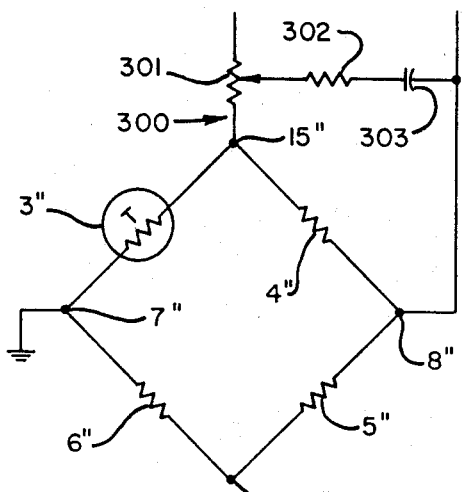
FIGURE 3 is a simplified schematic diagram of a modified form of the bridge portion of the control circuit.

Compensation for the difference in AC and DC bridge balance conditions may be provided by a shunt resistance network 300 across one arm of the bridge B, see FIGURE 3. This network comprises a potentiometer 301 connected to bridge terminal 15", resistor 302 connected to the arm of the potentiometer, and a blocking capacitor 303 connected between resistor 302 and bridge terminal 8". In a preferred embodiment operating with a 1kHz signal, a shunt resistance of approximately one megohm provided a satisfactory balance condition where 3" was a Yellow Springs Industries type 44006 thermistor, and resistors 4", and 5" and 6" were each 2610 ohm, one percent, resistors, which is essentially the thermistor resistance at 60° C. As previously noted, AC balance is not critical and, where the two balance conditions are different, the bridge steady-state point will be at the DC null temperature. Preferably this point should be sufficiently close to the AC null point to obtain the maximum sensitivity slope that occurs around the null.

What is claimed is:

1. A temperature controller for an oven comprising in combination:
   a source of electrical energy,
   an oven heater,
   means connected to said source and associated with said oven for producing an output which varies with the temperature of the oven,
   proportional control means directly responsive to and producing an output proportional to the output of said first named means, and
   integrating control means having an input directly responsive to the output of said first named means and producing an output proportional to the time integral of said input,
   said heater being energized in response to the outputs of said proportional control means and said integrating control means whereby to cause the temperature of said oven to remain substantially constant.

2. The controller according to claim 1 in which said integrating control means and said proportional control means are independently operatively connected to the output of said first named means.

3. The controller according to claim 2 in which the outputs of said integrating control means and said proportional control means are combined to produce a signal for controlling energization of said heater.

4. The controller according to claim 2 in which the electrical energy from said source has the form of both alternating current and direct current, said integrating control means being exclusively responsive to the direct current form of said energy.

5. The controller according to claim 2 in which said first named means comprises a bridge having 4 arms and 2 pairs of terminals defining the junctions of said arms, one of said arms having a temperature sensitive element therein, and
   means for applying said direct and alternating currents to one of said pairs of terminals,
   said proportional control means and said integrating control means being connected across the other of said pairs of terminals.

6. The controller according to claim 2 in which said first named means comprises a bridge having four arms and two pairs of terminals defining the junctions of said arms, one of said arms having a temperature sensitive element therein,
   means for applying said direct current to one of said pairs of terminals,
   means for applying said alternating current to the other of said pairs of terminals,
   said proportional control means being connected to said one of said pairs of terminals and said integrating control means being connected to the other of said pairs of terminals.

7. The controller according to claim 4 in which said integrating control means comprises a variable resistor having an ohmic value which varies with the time integral of said first named means.

8. In a system for regulating an instrumentality in response to changes in a variable and embodying a sensing element to detect said changes,
   means controlled by said sensing element for producing a voltage directly proportional to said changes in the variable,
   means controlled by said sensing element independent of said first named means for producing a voltage equal to the time integral of said changes in the variable, and
   a transducer responsive to said voltages for controlling said instrumentality.

9. The regulating system according to claim 8 with means for summing said voltages and means for connecting said summing means to said instrumentality.

References Cited

UNITED STATES PATENTS

| | | | |
|---|---|---|---|
| 2,932,714 | 4/1960 | Merrill | 219—501 |
| 3,040,158 | 6/1962 | Cutler et al. | 219—413 X |
| 3,107,285 | 10/1963 | Knapp | 219—505 X |
| 3,128,362 | 4/1964 | Clark et al. | 219—413 X |
| 3,322,982 | 5/1967 | Craiglow et al. | 219—503 X |
| 3,243,572 | 3/1966 | Vogt et al. | 219—505 X |
| 3,330,970 | 7/1967 | Wennerberg et al. | 219—505 X |
| 2,896,095 | 7/1959 | Reed et al. | 307—149 |
| 2,974,237 | 3/1961 | Ehret | 219—501 |
| 3,222,654 | 12/1965 | Widrow et al. | 317—231 |

BERNARD A. GILHEANY, *Primary Examiner.*

H. B. GILSON, *Assistant Examiner.*